(12) United States Patent
Olesen

(10) Patent No.: US 9,523,229 B2
(45) Date of Patent: Dec. 20, 2016

(54) HATCH ACTUATING ARRANGEMENT FOR ACTUATING A HATCH

(71) Applicant: SIEMENS AKTIENGESELLSCHAFT, München (DE)

(72) Inventor: Joern Olesen, Vejle (DK)

(73) Assignee: SIEMENS AKTIENGESELLSCHAFT (DE)

( * ) Notice: Subject to any disclaimer, the term of this patent is extended or adjusted under 35 U.S.C. 154(b) by 0 days.

(21) Appl. No.: 14/551,642

(22) Filed: Nov. 24, 2014

(65) Prior Publication Data

US 2015/0218868 A1 Aug. 6, 2015

(30) Foreign Application Priority Data

Feb. 4, 2014 (EP) .................................. 14153788

(51) Int. Cl.
| | | |
|---|---|---|
| *E05F 11/16* | (2006.01) | |
| *E04H 12/00* | (2006.01) | |
| *E05F 11/54* | (2006.01) | |
| *E06B 5/01* | (2006.01) | |

(Continued)

(52) U.S. Cl.
CPC ............... *E05F 11/16* (2013.01); *E04H 12/00* (2013.01); *E05F 11/54* (2013.01); *E06B 5/01* (2013.01); *E06C 7/006* (2013.01); *E06C 7/187* (2013.01); *F03D 80/88* (2016.05); *E05Y 2600/12* (2013.01);

(Continued)

(58) Field of Classification Search
CPC ........... E05F 11/54; E05F 11/16; E06C 7/006; E04H 12/003; E04H 12/00; E06B 5/01; F03D 11/0075; E04G 2001/155; E04F 11/00; E04F 11/04
See application file for complete search history.

(56) References Cited

U.S. PATENT DOCUMENTS

| 527,852 A | * | 10/1894 | Grosse | ..................... E04F 11/04 |
|---|---|---|---|---|
| | | | | 182/163 |
| 1,435,638 A | * | 11/1922 | Granger | ..................... E06B 5/01 |
| | | | | 49/339 |

(Continued)

FOREIGN PATENT DOCUMENTS

| DE | 534504 | * | 9/1931 |
|---|---|---|---|
| FR | 2 729 693 | * | 7/1996 |

(Continued)

OTHER PUBLICATIONS

European Search Report for European Application No. 14153788.6, mailed on Jun. 26, 2014.

*Primary Examiner* — Gregory Strimbu
(74) *Attorney, Agent, or Firm* — Schmeiser Olsen & Watts LLP

(57) ABSTRACT

A hatch actuating arrangement for actuating a hatch of a hatch device, with the hatch device being adapted to be disposed or being disposed within a tower structure of a wind turbine. A hatch actuator being movably supported relative to the hatch such that a downward force upon the hatch actuator and a weight of the hatch actuator urges the hatch to rotate toward the open position; and wherein the hatch actuator is connected to and positioned proximate a side of a ladder above the hatch so that a user may open the hatch while upon the ladder above the hatch.

12 Claims, 2 Drawing Sheets

(51) Int. Cl.
*E06C 7/00* (2006.01)
*E06C 7/18* (2006.01)

(52) U.S. Cl.
CPC ......... *E05Y 2600/45* (2013.01); *E05Y 2900/13* (2013.01); *Y02E 10/722* (2013.01)

(56) References Cited

U.S. PATENT DOCUMENTS

| | | | | |
|---|---|---|---|---|
| 3,038,555 | A | * | 6/1962 | Da Lee ................... E06C 7/006 182/128 |
| 3,044,572 | A | * | 7/1962 | Thomas .................... E21D 7/00 182/115 |
| 6,467,233 | B1 | * | 10/2002 | Maliszewski ......... E04H 12/085 290/44 |
| 2011/0138713 | A1 | * | 6/2011 | Reed ........................ E06B 5/01 52/204.1 |

FOREIGN PATENT DOCUMENTS

| | | | |
|---|---|---|---|
| FR | 2759733 | * | 8/1998 |
| FR | 2864136 | * | 6/2005 |
| GB | 296186 | * | 8/1928 |
| WO | WO 2013080392 A1 | | 6/2013 |

* cited by examiner

HATCH ACTUATING ARRANGEMENT FOR ACTUATING A HATCH

This application claims priority to EP14153788.6, having a filing date of Feb. 4, 2014, the entire contents of which is hereby incorporated by reference.

FIELD OF TECHNOLOGY

The following relates to a hatch actuating arrangement for actuating a hatch of a hatch device, with the hatch device being adapted to be disposed or being disposed within a tower structure, particularly a tower structure of a wind turbine.

BACKGROUND

It is known that tower structures, such as tower structures of wind turbines, occasionally have to be entered by service personnel for maintenance, repair, or service works. The service personnel has to pass respective hatches or hatch devices axially dividing the tower structure in compartments or inner volumes within a respective tower structure. Respective hatches or hatch devices are usually provided at platforms being disposed within respective tower structures.

It is regulated that service personnel has to wear safety gear while climbing ascending and/or descending structures, such as ladders etc., within the tower structure. However, respective safety gear securing the service personnel close to the inner circumference of the tower structure regularly causes problems when conventional hatches or hatch devices have to passed since it is hardly possible to reach the hatch and being safely secured at the same time.

Usually, the only possibility to reach respective hatches is to temporarily detach the safety gear. However, this compromises safety regulations as well as the safety of the service person as he might fall through the opened hatch.

SUMMARY

As aspect relates to providing a hatch actuating arrangement for actuating a hatch of a hatch device allowing an eased actuating of the hatch, particularly without the necessity to detach respective safety gear.

A further aspect relates to a hatch actuating arrangement for actuating a hatch of a hatch device, with the hatch device being adapted to be disposed or being disposed within a tower structure, particularly a tower structure of a wind turbine, comprising:
  a hatch device adapted to be disposed or being disposed between two axially adjacent inner volumes of a tower structure, the hatch device comprising a hatch, with the hatch being movably supported between an open position, in which a passageway between the two inner volumes is not obstructed, and a closed position, in which a passageway between the two inner volumes is obstructed,
  a hatch actuating means for actuating the hatch with the hatch actuating means being movably supported relative to the hatch device, wherein
  the hatch actuating means is coupled with the hatch in such a manner that by moving the hatch actuating means towards the hatch device, a force is applied to the hatch which force moves the hatch in its open position or secures the hatch in its open position.

Embodiments of the invention relate to a special hatch actuating arrangement. The hatch actuating arrangement generally serves for actuating, i.e. particularly opening, a hatch of a hatch device. As initially mentioned, respective hatches or hatch devices are typically provided with respective (closed or partially closed) platforms provided at different axial positions or height levels, respectively, within tower structures, i.e. particularly tower structures of/for wind turbines.

The essential components of the hatch actuating arrangement according to embodiments of the invention are a hatch device and a hatch actuating means.

The hatch device is adapted to be disposed or mounted between two axially adjacent inner volumes of a tower structure, i.e. particularly a tower structure of/for a wind turbine. The hatch device is usually disposed or mounted with respective platforms provided within respective tower structures. Hence, respective inner volumes within a tower structure are essentially confined by respective hatch devices defining certain height levels within the tower structure.

The hatch device comprises at least one hatch. The hatch is movably, i.e. particularly pivotably, supported between an open position and a closed position. The open position is generally defined in that a passageway between two axially adjacent inner volumes of the tower structure provided with the hatch actuating arrangement is not obstructed, i.e. possible for a person. The closed position is generally defined in that a passageway between two axially adjacent inner volumes of the tower structure provided with the hatch actuating arrangement is obstructed, i.e. not possible for a person. The movable, i.e. particularly pivotable, support of the hatch may be realised by hinges, pivot joints, or the like.

The hatch actuating means serves for actuating, i.e. particularly opening, the hatch. The hatch actuating means is movably supported relative to the hatch device, i.e. the hatch actuating means may be moved in a direction towards the hatch and in an opposite direction thereto. The movable support of the hatch actuating means may be realised by guiding means such as guidances etc.

The hatch actuating means is typically translationally movably supported between two end positions, whereby the hatch is positioned in its closed position when the hatch actuating means is positioned in its first end position and the hatch is positioned in its open position when the hatch actuating means is positioned in its second position.

Respective motions of the hatch actuating means are typically vertically orientated relative to ground. I.e., the trajectory of the motion of the hatch actuating means typically runs perpendicularly relative to a horizontal plane. Hence, respective motions of the hatch actuating means are typically axially orientated with reference to the centre axis of a tower structure provided with the hatch actuating arrangement. However, it is also possible that motions of the hatch actuating means are inclined. I.e. the trajectory of the motion of the hatch actuating means may also extend with a certain inclination (angle) relative to a horizontal plane.

According to embodiments of the invention, there exists a coupling between the hatch of the hatch device and the hatch actuating means. The coupling of the hatch and the hatch actuating means is realised in such a manner that by moving the hatch actuating means towards the hatch device, a force is applied to the hatch which force moves the hatch in its open position or secures the hatch in its open position. The force applied to the hatch is typically a tensile force.

Thus, the coupling between the hatch actuating means and the hatch allows for a coupled movement of the hatch actuating means and the hatch. A coupled movement means that a motion of the hatch actuating means relative to the hatch device, i.e. particularly towards the hatch device, result in a motion of the hatch from its closed position to its open position. Thereby, the vector of the motion of the hatch actuating means towards the hatch device is typically oppositely directed to the vector of the force applied to the hatch.

In the mounted state of the hatch actuating arrangement, i.e. in the state in which the hatch actuating arrangement is mounted within a respective tower structure, the hatch actuating means typically has to be moved in, particularly axially or vertically, downward direction in order to create and apply the force on the hatch.

The inventive principle allows for an eased actuation of hatches of respective hatch devices since in order to actuate, i.e. particularly open, the hatch, only the hatch actuating means has to be moved towards the hatch device resulting in an opening of the hatch. Hence, when providing a tower structure with the hatch actuating arrangement according to embodiments of the invention, a person only has to move the hatch actuating means towards the hatch device when he is willing to open the hatch. Moving the hatch actuating means towards the hatch device is in any case possible, i.e. particularly possible when wearing respective safety gear.

The inventive principle works with all kinds of hatches, i.e. particularly single- or multipart hatches, the latter comprising a number of separate hatch segments (cf. double wing hatches, for instance).

According to an embodiment of the invention, the hatch actuating means comprises an actuating element. The actuating element may be provided as an actuating bar, an actuation rod, or the like. Generally, it is preferred that the actuation element has an elongate geometry or shape.

According to a further embodiment of the invention, coupling is achieved by means of a coupling means, whereby the coupling means is coupled to an or the actuating element of the hatch actuating means at a first coupling point and the coupling means is coupled to the hatch at a second coupling point. The coupling means generally serves for establishing a mechanical coupling between the hatch and an actuating element of the hatch actuating means. Thereby, mechanical coupling includes form- and/or force- and/or material fit couplings. The coupling means may be built as a band, a rope, a wire, or the like.

Thereby, a first coupling point establishes a mechanical coupling of the coupling means with the actuating element and a second coupling point establishes a mechanical coupling of the coupling means with the hatch. The first coupling point is typically provided at a free end of the actuating element with the free end facing towards the hatch device. The second coupling point is typically provided at a top side of the hatch with the top side facing towards the actuating element.

According to a further embodiment of the invention, the coupling means is guided along a deflecting means, the deflecting means being adapted to deflect the course of the coupling means between the two coupling points by a certain degree. The deflecting means serves for deflecting, i.e. typically inverting, the course of the coupling means between the two coupling points. The course of the coupling means is typically deflected by 180°. Thus, the deflecting means also allows for the fact that motions of the hatch actuating means towards the hatch device result in (essentially oppositely) directed motions of the hatch from its closed in its open position. The deflecting means is therefore, (at least functionally) interposed between the hatch actuating means and the hatch. The deflecting means may be provided as a deflecting roll or a deflecting pulley, for instance.

The hatch actuating means, particularly the actuating element, is movably supported relative to the deflecting means. Hence, the deflecting means is typically not disposed at the hatch actuating means, but with a different component. The deflecting means is fixed at a given position, i.e. the position of the deflecting means cannot be changed.

According to a further embodiment of the invention, the weight of the hatch actuating means is such that a weight force equal or less than the force applied to the hatch when moving the hatch actuating means towards the hatch device is created. Hence, the weight of the hatch actuating means may act as a counterweight allowing for an eased transfer of the hatch from its closed position in its open position.

Particularly, when the weight of the hatch actuating means is chosen in such a manner that it equals the force which has to be applied to the hatch in order to transfer it from its closed position in its open position, a balance of forces may be realised between the weight force of the hatch actuating means and the force which is necessary for actuating, i.e. opening, the hatch. Hence, the force for moving the hatch actuating means and thereby, opening the hatch may be held comparatively small. If the weight force of the hatch actuating means is less than the force which is necessary for actuating, i.e. opening, the hatch, the hatch will always tend to automatically return to its closed position.

According to a further embodiment of the invention, the hatch actuating means comprises at least one connecting means for connecting the hatch actuating means to the inside of a tower structure and/or a further component provided within a tower structure. The connecting means of the hatch actuating means serve for connecting the hatch actuating means to a tower structure and/or a further component provided within a tower structure. A respective component provided within a tower structure may be an ascending and/or descending means such as a ladder, for instance. Thereby, the hatch actuating means is typically disposed in close proximity to a respective ascending and/or descending so that a person climbing the ascending and/or descending may easily reach the hatch actuating means despite the fact that he is "constrained" by wearing safety gear.

Embodiments of the invention also relates to a tower structure, particularly a tower structure of/for a wind turbine. The tower structure comprises at least one hatch actuating arrangement as previously specified.

Embodiments of the invention also relates to a wind turbine, comprising a tower structure as previously specified.

Both regarding the tower structure and the wind turbine all annotations regarding the hatch actuating arrangement apply in analogous manner.

BRIEF DESCRIPTION

Some of the embodiments will be described in detail, with reference to the following figures, wherein like designations denote like members, wherein.

DETAILED DESCRIPTION

Figure 1:
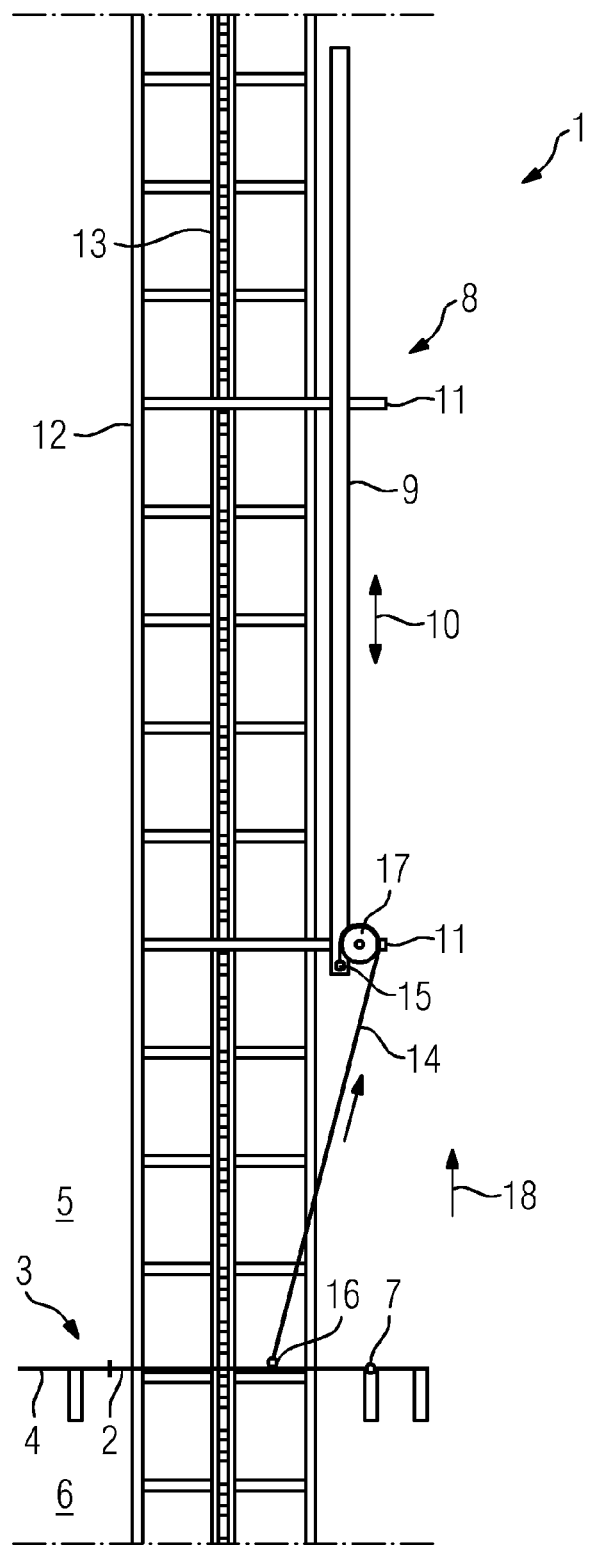
FIG. 1 shows a principle drawing of a hatch actuating arrangement in a first position according to an exemplary embodiment of the invention.

FIG. 1, 2 both show a principle drawing of a hatch actuating arrangement 1 according to an exemplary embodiment of the invention. The hatch actuating arrangement 1 serves for actuating, i.e. particularly opening, a hatch 2 of a hatch device 3. Both the hatch actuating arrangement 1 and the hatch device 3 are provided within a tower structure (not explicitly shown) of a wind turbine (also not explicitly shown).

The hatch actuating arrangement 1 comprises a hatch device 3, the latter comprising the hatch 2. The hatch device 3 is provided with a platform 4 provided at a certain height level within the tower structure. Hence, the hatch device 3 and the platform 4, respectively, axially divide the tower structure in respective axially adjacent inner volumes 5, 6. A first inner volume 5 is located above the hatch device 3 or platform 4, respectively, a second inner volume 6 is located below the hatch device 3 or platform 4, respectively.

The hatch 2 is movably, i.e. pivotably, supported between an open position (cf. FIG. 2) and a closed position (cf. FIG. 1). The open position of the hatch 2 is defined in that a passageway between the two volumes 5, 6 is not obstructed by the hatch 2, i.e. a person can pass from the first inner volume 5 to the second inner volume 6, and vice versa. The closed position of the hatch 2 is defined in that a passageway between the two volumes 5, 6 is obstructed by the hatch 2, i.e. a person cannot pass from the first inner volume 5 to the second inner volume 6, and vice versa.

The movable or pivotable support of the hatch 2 is realised by a hinge joint, i.e. a hinge 7 which interconnects the hatch 2 with the platform 4.

The hatch actuating arrangement 1 further comprises a hatch actuating means 8. The hatch actuating means 8 comprises an elongate actuating element 9 in the shape of an actuating bar. The hatch actuating means 8, i.e. the actuating element, is vertically movably supported in a direction parallel to the centre or longitudinal axis of the tower structure (cf. double arrow 10).

Respective motions of the hatch actuating means 8 and the actuating element 9, respectively are vertically orientated relative to ground. I.e. the trajectory of the motion of the hatch actuating means 8 and the actuating element 9, respectively runs perpendicularly relative to a horizontal plane. Hence, respective motions of the hatch actuating means 8 and the actuating element 9, respectively are axially orientated with reference to the centre axis of the tower structure.

The movable support of the hatch actuating means 8 and the actuating element 9, respectively is established by upper and lower guiding means 11, i.e. linear guidances, allowing for linear/translational motions of the hatch actuating means 8 and the actuating element 9, respectively in the axial or vertical direction.

Therefore, the hatch actuating means 8 comprises connecting means (not explicitly shown) for connecting the actuating element 9 to the inside of the tower structure, i.e. particularly to an ascending and/or descending means 12 in the shape of a ladder vertically extending within the tower structure. Connection of the actuating element 9 to the ascending and/or descending means 12 may be realised by bolted and/or welded connections, for instance.

The hatch actuating means 8, i.e. particularly the actuating element 9, also allows for an extra support of a person climbing the ascending and/or descending means 12.

A safety rail 13 for interconnecting with safety gear, such as a safety harness or the like, worn by personnel climbing the ascending and/or descending means 12 is provided with the ascending and/or descending means 12.

A mechanical coupling of the actuating element 9 and the hatch 2 is provided by a coupling means 14 in the shape of a metal wire. As is discernible, the coupling means 14 is coupled to the actuating element 9 at a first coupling point 15 and to the hatch 2 at a second coupling point 16. The first coupling point 15 is provided at the free end of the actuating element 9 with the free end facing towards the hatch device 3. The second coupling point 16 is provided at a top side of the hatch 2 with the top side facing towards the free end of the actuating element 9.

As is further discernible, the coupling means 14 is guided along a deflecting means 17 in the shape of a deflecting roll. The deflecting means 17 is interposed in the course of the coupling means 14 between the two coupling points 15, 16. The deflecting means 17 allows for a deflection of the course of the coupling means 14 between the two coupling points 15 by 180°. I.e., the deflecting means 17 inverts the course of the coupling means 14.

The deflecting means 17 is stably mounted with the lower guiding means 11 and cannot be vertically moved. However, the hatch actuating means 8 and the actuating element 9, respectively are movably relative to the deflecting means 17.

The hatch actuating arrangement 1 as specified above allows for an eased actuation of the hatch 2. In order to actuate, i.e. particularly open, the hatch 2, the hatch actuating means 8, i.e. particularly the actuating element 9, has to be moved vertically downward towards the hatch device 3. This motion of the actuating element 9 results in a vertically upwardly directed tensile force (cf. arrow 18) applied to the hatch 2 and consequently, an opening of the hatch 2.

Thus, coupling of the hatch 2 and the hatch actuating means 8 is realised in such a manner that by moving the actuating element 9 vertically downward towards the hatch device 3, a force is applied to the hatch 2 which force moves the hatch 2 in its open position or secures the hatch 2 in its open position.

Thereby, coupling between the hatch actuating means 8 and the hatch 2 allows for a coupled movement of the actuating element 9 and the hatch 2. The coupled movement particularly allows that vertically downwardly directed motions of the actuating element 9 relative to the hatch device 3, i.e. particularly vertically downwardly towards the hatch device 3, result in a motion of the hatch 2 from its closed position to its open position. Thereby, the vector of the motion of the actuating element 9 towards the hatch device 3 is oppositely directed to the vector of the force applied to the hatch 2.

Figure 2:
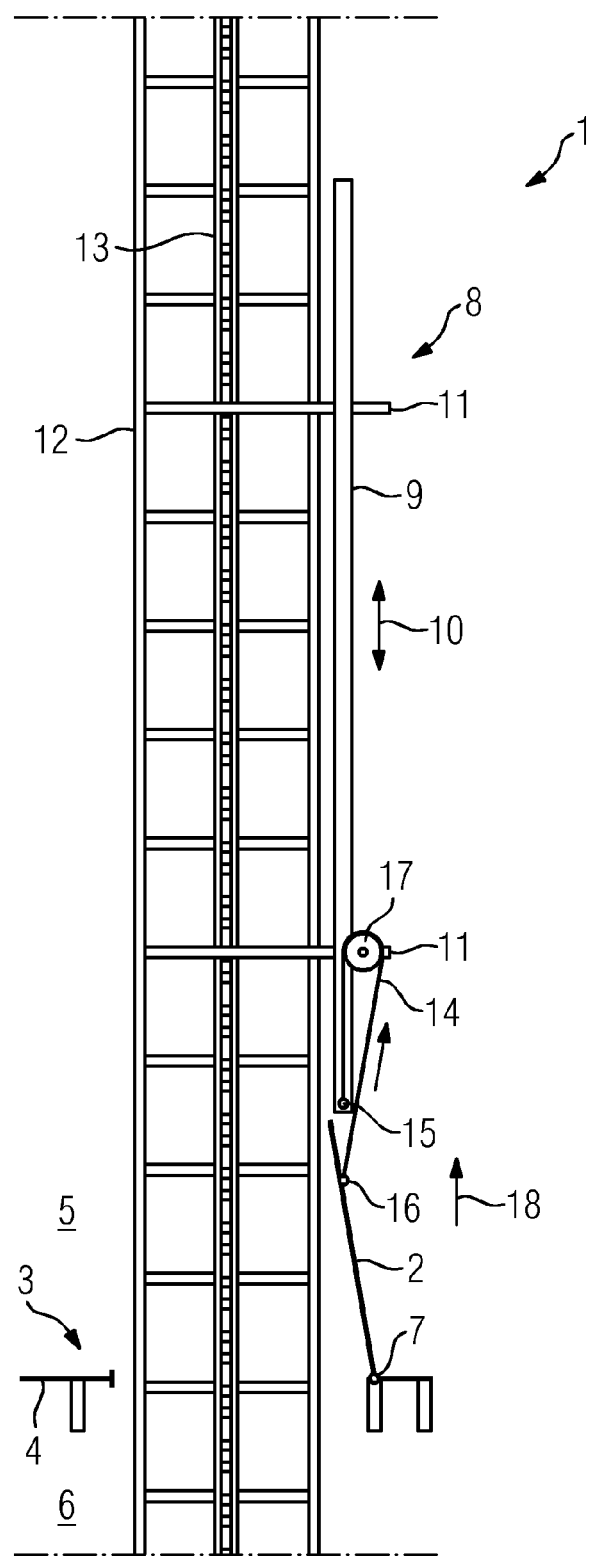
FIG. 2 shows a principle drawing of a hatch actuating arrangement in a second position according to an exemplary embodiment of the invention.

As is discernible when comparing FIG. 1, 2, it can be said that the hatch actuating means 8 or the actuating element 9, respectively is translationally movably supported between two end positions. Thereby, the hatch 2 is positioned in its closed position when the hatch actuating means 8 or the actuating element 9, respectively is positioned in its first end position (cf. FIG. 1) and the hatch 2 is positioned in its open position when the hatch actuating means 8 or the actuating element 9, respectively is positioned in its second position (cf. FIG. 2).

All in all, a person climbing down the ascending and/or descending means 12 only has to move the actuating element 9 towards the hatch device 3 when he is willing to open the hatch 2. Moving the actuating element 9 towards the hatch device 3 is in any case possible, i.e. particularly possible when the person wears respective safety gear.

In order to ease opening the hatch 2, the weight of the actuating element 9 is chosen in such a manner that a weight force equal or less than the force applied to the hatch 2 when moving the actuating element 9 towards the hatch device 3 is created. Hence, the weight of the actuating element 9 acts as a counterweight allowing for an eased transfer of the hatch 2 from its closed position in its open position. In such a manner, the force for moving the actuating element 9 and thereby, opening the hatch 2 is held comparatively small. If the weight force of the actuating element 9 is less than the force which is necessary for actuating, i.e. opening, the hatch 2, the hatch 2 will always tend to automatically return to its closed position.

Although the present invention has been described in detail with reference to the preferred embodiment, embodiments of the invention are not limited by the disclosed examples from which the skilled person is able to derive other variations without departing from the scope of the invention.

The invention claimed is:

1. A hatch system, comprising:
    a ladder;
    a hatch adapted to be disposed between two vertically adjacent inner volumes of a tower structure, the hatch being pivotably supported between an open position, in which a passageway between the two inner volumes is not obstructed by the hatch, and a closed position, in which the passageway between the two inner volumes is obstructed by the hatch and wherein the ladder extends in the passageway above and below the hatch when the hatch is in the open and closed positions,
    a hatch actuator for actuating the hatch with the hatch actuator being movably supported relative to the hatch, wherein a downward force upon the hatch actuator and a weight of the hatch actuator urges the hatch to rotate toward the open position; wherein the hatch actuator is connected to the ladder and positioned proximate a side of the ladder above the hatch so that a user may open the hatch while upon the ladder above the hatch and wherein the hatch actuator moves linearly in a direction which is parallel to a longitudinal axis of the ladder as the hatch moves between the open and closed positions.

2. The hatch system according to claim 1, wherein the hatch actuator comprises an actuating bar.

3. The hatch system according to claim 2, wherein the hatch actuator is coupled with the hatch by a coupler, whereby the coupler is coupled to the actuating bar of the hatch actuator at a first coupling point and the coupler is coupled to the hatch at a second coupling point.

4. The hatch system according to claim 3, wherein the first coupling point is provided on a free end of the actuating bar, the free end facing towards the hatch, and the second coupling point is provided on a top side of the hatch, the top side facing towards the actuating bar.

5. The hatch system according to claim 3, wherein the coupler is guided by a deflector, the deflector being adapted to deflect a course of the coupler between the two coupling points.

6. The hatch system according to claim 5, wherein the actuating bar, is movably supported relative to the deflector.

7. The hatch system according to claim 1, wherein the hatch actuator is moveable between a first end position and a second end position, whereby the hatch is positioned in the closed position when the hatch actuator is positioned in the first end position and the hatch is positioned in the open position when the hatch actuator is positioned in the second end.

8. The hatch system according to claim 1, wherein the weight of the hatch actuator is equal to or less than a force applied to the hatch when moving the hatch from the closed position towards the open position.

9. The hatch system according to claim 1, wherein the hatch actuator comprises at least one connector for connecting an hatch actuator to at least one of the inside of a tower structure and the ladder.

10. The hatch system according to claim 9, wherein the hatch in the open position is proximate a side of the ladder and fits within one of the two inner volumes of the tower structure.

11. A tower structure, comprising the hatch system according to claim 1.

12. A wind turbine, comprising the tower structure according to claim 11.

* * * * *